(12) United States Patent
Kim

(10) Patent No.: US 10,171,198 B2
(45) Date of Patent: Jan. 1, 2019

(54) CHANNEL SET UP METHOD OF OPTICAL RECEIVER WITH WAVELENGTH TUNABLE FILTER

(71) Applicant: PHOVEL.CO.LTD., Daejeon (KR)

(72) Inventor: Jeong-Soo Kim, Gongju-si (KR)

(73) Assignee: PHOVEL. CO.LTD., Yuseong-Gu, Daejeon (KR)

( * ) Notice: Subject to any disclaimer, the term of this patent is extended or adjusted under 35 U.S.C. 154(b) by 0 days.

(21) Appl. No.: 14/889,457

(22) PCT Filed: Aug. 10, 2015

(86) PCT No.: PCT/KR2015/008335
§ 371 (c)(1),
(2) Date: Nov. 6, 2015

(87) PCT Pub. No.: WO2016/178460
PCT Pub. Date: Nov. 10, 2016

(65) Prior Publication Data
US 2018/0054272 A1 Feb. 22, 2018

(30) Foreign Application Priority Data
May 6, 2015 (KR) .................... 10-2015-0063346

(51) Int. Cl.
*H04J 14/02* (2006.01)
*H04B 10/67* (2013.01)
*H04B 10/69* (2013.01)

(52) U.S. Cl.
CPC .......... *H04J 14/0227* (2013.01); *H04B 10/67* (2013.01); *H04B 10/675* (2013.01); *H04B 10/69* (2013.01)

(58) Field of Classification Search
CPC .... H04J 14/0227; H04J 14/02; H04J 14/0221; H04J 14/021; H04B 10/67; H04B 10/69;
(Continued)

(56) References Cited

U.S. PATENT DOCUMENTS 5,717,510 A * 2/1998 Ishikawa ............ H04B 10/0795
398/147
5,808,762 A * 9/1998 Vanoli .................. H04B 10/077
398/79

(Continued)

FOREIGN PATENT DOCUMENTS

| CN | 103229440 A | 7/2013 |
| KR | 20130018465 A | 2/2013 |
| KR | 20150001565 A | 1/2015 |

OTHER PUBLICATIONS

CN Office Action corresponding to CN Appln. No. 201580000836.4 dated Dec. 11, 2017.

*Primary Examiner* — Hibret Woldekidan
(74) *Attorney, Agent, or Firm* — Davis & Bujold PLLC; Michael J. Bujold

(57) ABSTRACT

The present invention relates to A channel set up method of optical receiver with wavelength tunable filter such as an etalon filter in a TO type received wavelength-tunable optical receiver.

According to the method of setting a channel in a wavelength-tunable optical receiver of the present invention, by circularly receiving communication channels within a predetermined temperature range, in which selectively receiving communication channel using two adjacent transmissive modes in the transmissive modes of a wavelength-tunable filter, it is possible to individually select and receive all communication channels with a predetermined temperature range. Further, it is possible to use all FP type etalon filters regardless of transmissive wavelength characteristics in at a specific temperature of a wavelength-tunable filter, so it is possible to reduce a manufacturing cost and power consumption of a product and increase thermal stability of a package.

8 Claims, 4 Drawing Sheets

(58) Field of Classification Search
CPC .. H04B 10/506; H04B 10/572; H04B 10/675; H04B 10/07957; H04B 10/0795; H04B 2210/252; H04B 10/40; G02F 2203/21; G02F 1/0147; G02F 2203/055; G02F 1/133382
USPC ............ 398/79, 85, 94, 95, 202, 208, 90, 25
See application file for complete search history.

(56) References Cited

U.S. PATENT DOCUMENTS

| | | | | |
|---|---|---|---|---|
| 5,909,297 | A * | 6/1999 | Ishikawa | H04L 7/0037 398/198 |
| 5,949,562 | A * | 9/1999 | Kubota | H04J 14/0224 398/79 |
| 6,188,499 | B1 * | 2/2001 | Majima | H04B 10/506 398/208 |
| 6,498,871 | B1 * | 12/2002 | Kuboki | H04B 10/506 385/24 |
| 6,504,616 | B1 * | 1/2003 | Haber | G01J 3/26 356/480 |
| 6,985,281 | B2 * | 1/2006 | Wagner | G02B 6/4204 359/315 |
| 7,433,361 | B1 * | 10/2008 | Smith | H04L 12/403 370/401 |
| 8,934,058 | B2 * | 1/2015 | Chou | H04B 10/67 341/137 |
| 9,077,476 | B2 * | 7/2015 | Yan | H04B 10/0799 |
| 9,106,361 | B2 | 8/2015 | Na et al. | |
| 9,436,021 | B2 * | 9/2016 | Ye | G02F 1/0147 |
| 9,627,847 | B2 * | 4/2017 | Kim | H01S 5/02446 |
| 2005/0213618 | A1 * | 9/2005 | Sochava | H01S 5/06255 372/20 |
| 2011/0081146 | A1 * | 4/2011 | Nakajima | H04J 14/0204 398/48 |
| 2011/0249690 | A1 * | 10/2011 | Sato | H01S 5/141 372/20 |
| 2014/0099105 | A1 | 4/2014 | Yan | |
| 2014/0241726 | A1 | 8/2014 | Ho et al. | |
| 2016/0112776 | A1 * | 4/2016 | Kim | G02F 1/0147 398/48 |

\* cited by examiner

[FIG. 1]
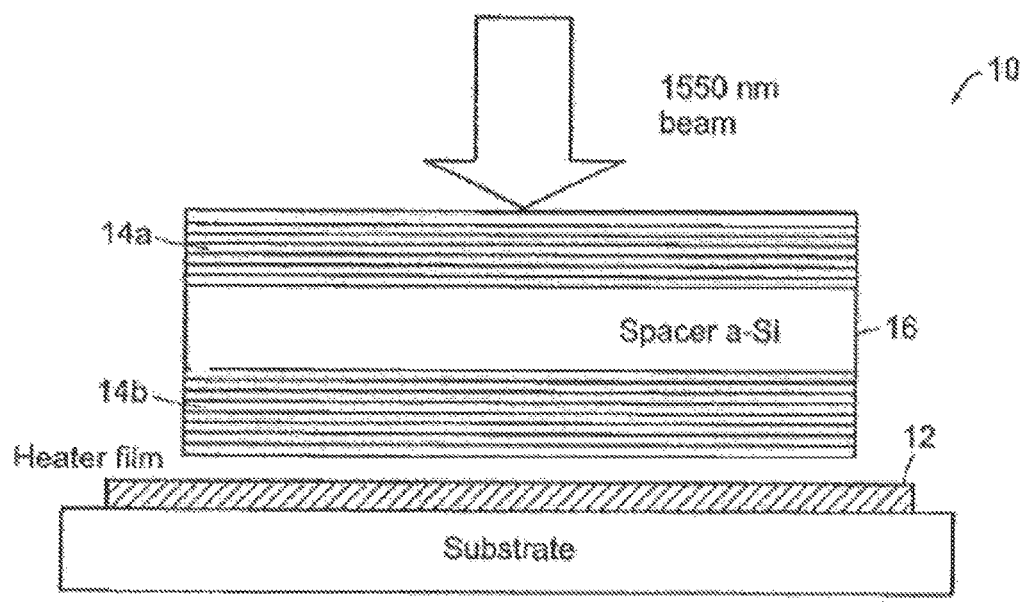

[FIG. 2]
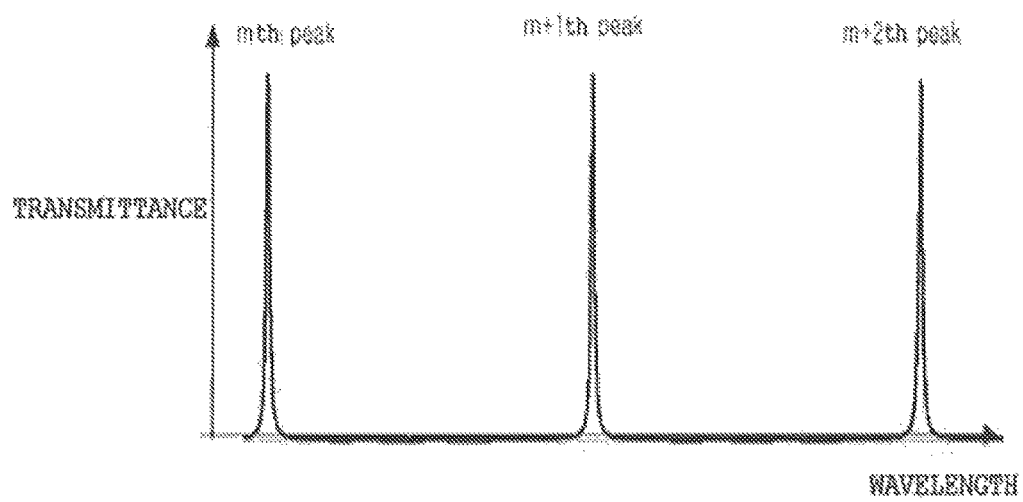
[FIG. 3]
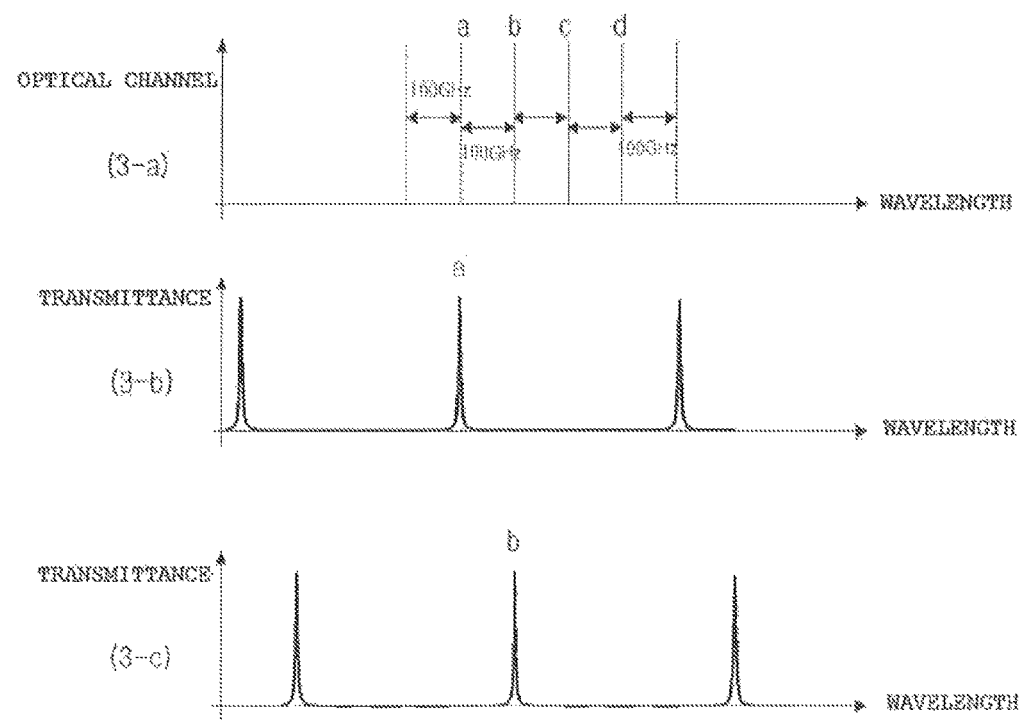

[FIG. 4]
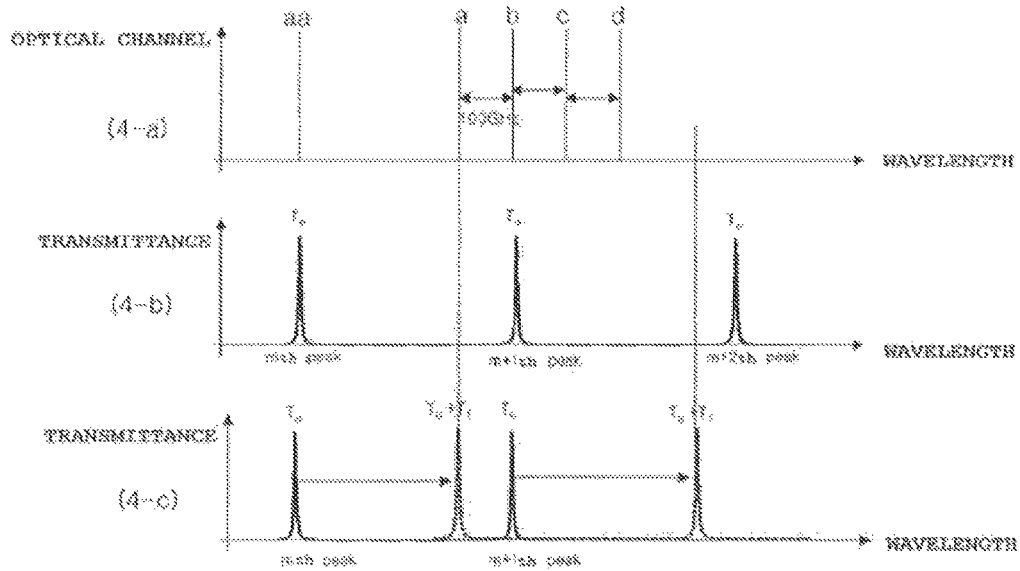
[FIG. 5]
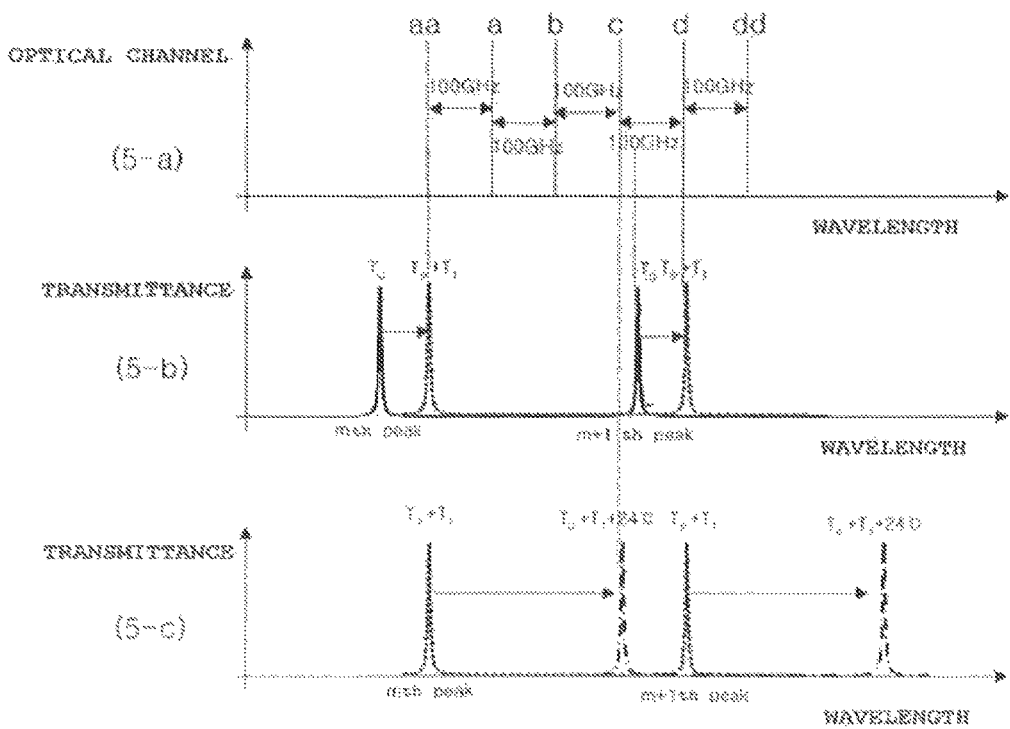

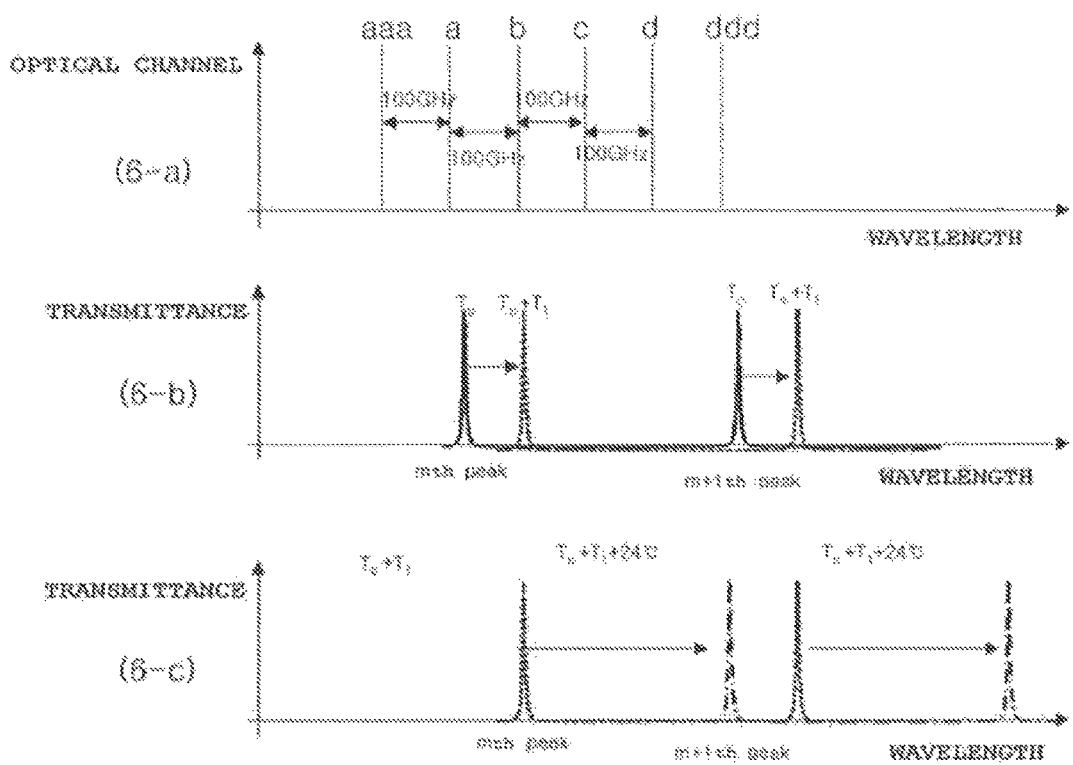

CHANNEL SET UP METHOD OF OPTICAL RECEIVER WITH WAVELENGTH TUNABLE FILTER

TECHNICAL FIELD

The present invention relates to a channel set up method of optical receiver with wavelength tunable filter, particularly, a channel set up method of setting a wavelength channel, using a wavelength-tunable filter that is an etalon filter in a TO (transistor outline) type wavelength-tunable optical receiver.

BACKGROUND ART

Recently, communication services with large communication capacity, including video service for smartphones, have been provided. Accordingly, there is a need for greatly increasing the existing communication capacity and a DWDM (Dense Wavelength Division Multiplexing) type communication has been adopted to increase communication capacity using optical fibers that were installed already. The DWDM is a type that transmits light having several wavelengths through one optical fiber, using a phenomenon that light signals having several wavelengths do not interfere with each other even if they are simultaneously transmitted through one optical fiber, because laser lights having different wavelengths do not interfere with each other.

At present, NG-PON2 (Next Generation-Passive Optical Network version2) is internationally under consideration as a standard and NG-PON2 sets four channel wavelengths for downward optical signals for subscribers from stations at a signal speed of 10 Gbps class. The wavelength spacing of the four channels is set to 100 GHz. Downward wavelengths set with a spacing of 100 GHz under the international standard, NG-PON2 are as follows.

TABLE 1

| Channel | Central Frequency (THz) | Wavelength (nm) |
| --- | --- | --- |
| 1 | 187.8 | 1596.34 |
| 2 | 187.7 | 1597.19 |
| 3 | 187.6 | 1598.04 |
| 4 | 187.5 | 1598.89 |
| 5 | 187.4 | 1599.75 |
| 6 | 187.3 | 1600.60 |
| 7 | 187.2 | 1601.46 |
| 8 | 187.1 | 1602.31 |

An optical receiver is supposed to selectively receive optical signals, which is supposed to be received, in the optical signals simultaneously transmitted through at least four adjacent channels in the set wavelengths, and is supposed not to receive other three optical signals.

For wavelength-selective optical reception of optical receivers, wavelength-tunable optical receivers that can dynamically determine a reception wavelength have been developed. As wavelength-tunable filters used in those wavelength-tunable optical receivers, Fabry-Perot (FP) type etalon filters manufactured by depositing dielectric thin films having high and low refractive indexes on both sides of a semiconductor substrate made of silicon, GaAs, or InP of which the refractive indexes change in accordance with temperature.

FIG. 1 illustrates a wavelength-tunable filter employed in U.S. Pat. No. 6,985,281. The wavelength-tunable filter in the above U.S. patent transmits only specific wavelengths by alternately depositing amorphous silicon and $SiO_2$ on a glass substrate used in this art.

FIG. 2 illustrates a transmissive characteristic curve of an FP type etalon filter. The FP type etalon filter is defined as a wavelength-selective filter having a plurality of transmissive peaks with a predetermined period (FSR: Free spectral range) based on frequency. The FSR (free spectral range) means a wavelength spacing or a frequency spacing between adjacent channels in an FP type etalon filter and is an important factor in the FP type etalon filter.

The FSR is determined by the following Equation 1 in relation with refractive index of the material of a resonator and the length of the resonator in an FR type etalon filter.

$$FSR = c/(2 \times n \times d \times \cos\theta) \quad \text{[Equation 1]}$$

where c is a light speed, n is a refractive index of the material of a resonator in an etalon filter, d is the incident angle of light on the etalon filter, and θ is the incident angle of light on the etalon filter.

In Equation 1, when the etalon filter is arranged perpendicular to the traveling direction, θ may be considered as "0", which means cos=1. A rate of change of FSR to the length of a resonator in an etalon filter that is an important variable for manufacturing an etalon filter can be expressed as the following Equation 2.

$$\delta(FSR) = c/(2 \times n \times d^2) \times \delta d \quad \text{[Equation 2]}$$

Accordingly, a ratio relative of change of the FSR according to a little change in length of the resonator can be expressed, by the following Equation 3.

$$\delta(FSR)/FSR = \delta d/d \quad \text{[Equation 3]}$$

As in Equation 3, the rate of relative change of the FSR is in proportion only to the rate of change in length of the resonator, and the FSR of an etalon filter can be easily adjusted within 1% by precisely adjusting the thickness by 1%.

For example, the length of a resonator in a silicon etalon filter having a spacing of 400 GHz is about 117 um, so when the thickness of the etalon filter is adjusted with precision of 1.17 um that is 1.0% of the length of the resonator, the FSR has precision of 400 GHz +/4 GHz.

FIG. 3 illustrates a process of setting a wavelength and selecting an optical signal at one wavelength by a wavelength-tunable filter in a structure following NG-PON2, in DWDM (dense wavelength division multiplexing) with 4 channels at 100 GHz.

FIG. 3-a illustrates an optical wavelength signal with four channels a, b, c, and d with a spacing of 100 GHz. In FIG. 3-a, the dotted line illustrates a channel used in optical communication and a wavelength having a spacing of 100 GHz and, are not used in actual optical communication. That is, in FIG. 3-a, the dotted line illustrates not actual optical signals, and only a, b, c, and d illustrated by solid lines mean wavelength having an actual communication signal.

As in FIG. 3-a, it is assumed that when four wavelengths simultaneously travel into a wavelength-tunable optical receiving element, a wavelength-tunable filter is an FP type etalon filter having a spacing of at least 400 GHz, as in FIG. 3-b. This embodiment will be described when FSR is 400 GHz. However, there is no problem in use if the FSR of an FP type etalon filter is actually 350 GHz or more. As in FIG. 3-b, it is assumed that the channel a is selected from the wavelengths of four channels, using an FP type etalon filter having an FSR of 400 GHz. In this case, the adjacent transmissive filter band of the FP type etalon filter has a wavelength spacing of at least 100 GHz from the channel d. Therefore, in the four channels a, b, c, and d, it is possible to selectively receive an optical signal only through the channel a, not the channels b, c, and d. Above, an FP type etalon filter having a wavelength spacing of 400 GHz is used. If an FP type etalon filter having an FSR of 380 GHz is used, the adjacent transmissive band of the FP type etalon filter has a wavelength spacing of at least about 80 GHz from the channels a, b, c, and d when the FP type etalon filter receives any one of the channels a, b, c, and d. In general, FP type etalon filters can very easily achieve a −20 dB light isolation line breadth at about 80 GHz, so it is possible to effective receive an optical signal through any one of four 100 GHz channels without a problem, using an FP type etalon filter having an FSR of 380 GHz or 400 GHz. Further, when the FSR is 400 GHz or more, a plurality of transmissive peaks of the FP type etalon filter do not simultaneously select two channels in any cases. Accordingly, FP type etalon filters are available for wavelength-tunable optical receivers as long as the FSR is 380 GHz or more, so thickness of precision of FP type etalon filters is very relaxed in terms of the FSR.

FIG. 3-c illustrates selecting the channel "b" by changing the transmissive wavelength band of a FP type etalon filter having the transmissive wavelength band of FIG. 3-b. In particular, FP type etalon filters based on semiconductor substrates made of silicon, InP, and GaAs increase in refractive index with an increase in temperature, resulting in moving the transmissive wavelength band to a long wavelength. This process can be explained by Bragg's law.

$$m \times \lambda = 2 \times n \times d \times \cos\theta \quad \text{[Equation 4]}$$

where λ is the wavelength of light passing through an FP type etalon filter, m is a positive natural number, n is the refractive index of the material of a resonator in the etalon filter, d is the distance of the resonator in the etalon filter, and θ is an incident angle of light on the etalon filter.

That is, when the temperature of an FP type etalon filter is changed by the Equation 4, the refractive index of the resonator in the etalon filter changes and, the transmissive wavelength band changes accordingly. In general, semiconductor substances such as Si, GaAs, and InP increases in wavelength by about 12 GHz/° C., so a transmissive wavelength transfers to an adjacent channel with a spacing of about 8° C. That is, for example, when the temperature of an FP type etalon filter transmitting the channel "a" is 32° C., the FP type etalon filter transmits the channels "b", "c", and "d" at 40° C., 48° C., and 56° C., respectively.

There are two methods, at present, of adjusting the temperature of FP type etalon filters, a method of using a heater and a method of using a thermoelectric element, but both methods cannot adjust temperature within a large range. That is, when a heater is used, it is impossible to operate an etalon filter within a temperature range higher than the temperature of the external environment. For example, when the temperature of an external environment increases up to 80° C., an etalon filter has to operate at 90° C. or more to be able to adjust the temperature. However, considering thermal stability of the material of an etalon filter and package parts, the etalon filter should be operated at as low temperature as possible, and for example, a range of 40° C. from 90 to 130° C. can be set. However, in this case, the minimum temperature range for achieving all of the channels "a", "b", "c", and "d" is 24° C., so the temperature range for selecting the channel "a" should be within 90 to 106° C. to be able to select all the four channels in the range of 90 to 130° C.

If a thermoelectric element is used, similarly, when the temperature is too lower than the temperature of an external environment, power consumption increases, so it is preferable to operate the thermoelectric element within the range of 40 to 80° C. When the transmissive wavelength band of an FP type etalon filter is adjusted by a thermoelectric element, the temperature range of the etalon filter for selecting the channel "a" should be within the range of 40 to 56° C. in order to selectively transmit all channels within the range of 40 to 80° C., using the etalon filter.

In detail, when a thermoelectric element is used, it is possible to selectively transmit all the four channels within the range of 40 to 80° C. of the temperature of the thermoelectric element, only when an FP type etalon filter has the wavelength of the channel "a" and a transmissive wavelength band within +/−0.8 nm at 48° C.

Further, the following Equation 5 can be obtained from Equation 4, $$\delta\lambda/\lambda = \delta d/d \quad \text{[Equation 5]}$$

where, thickness should be adjusted with accuracy of 58 nm to precisely adjust the wavelength with precision of +/−0.8 nm.

$$\delta d = d \times \delta\lambda/\lambda = 116 \text{ um} \times 0.8 \text{ nm}/1596 \text{ nm} = 0.058 \text{ um} = 58 \text{ nm} \quad \text{[Equation 6]}$$

In Equation 6, an etalon filter having an FSR of 400 GHz and optical communication in 1596 nm band is considered and the allowable wavelength, precision was limited within +/−0.8 nm. The thickness of 58 um cannot be adjusted actually, so the spacing of an etalon filter can be very easily adjusted, whereas the position of the transmissive peak of the etalon filter cannot be adjusted. Accordingly, it is possible, in this case, to select a wavelength-tunable filer by randomly manufacturing an etalon filter and then selecting an etalon filter having a transmissive peak within +/−0.8 nm at a predetermined temperature of the etalon filter. However, in this case, since the etalon filter is randomly manufactured, only a quarter of an FP type etalon filter having a plurality of transmissive peaks has a desired wavelength band, so there is a problem in that a loss increases in the etalon filter. When the operation temperature range of a heater or the operation temperature range of a thermoelectric element to reduce a loss in an etalon filter is increased, it occur problem that power consumption is increased and problem of the thermal stability of the package components.

PRIOR ART DOCUMENT

Patent Document (Patent Document 1) U.S. Pat. No. 6,985,281 (2006 Jan. 10)

DISCLOSURE

Technical Problem

The present invention is for solve the problem with setting a channel in wavelength-tunable optical receivers of the related art. An object of the present invention is to provide a channel set up method of optical receiver with wavelength tunable filter in order to use all of wavelength-tunable filers within an operation temperature range of 40° C.

Technical Solution

An optical receiver according to the present invention for achieving the object receives n channels within a temperature range of +/−4° C. from a predetermined temperature and sequentially sets channels n+1, n+2, and n+3 by increasing the temperature of a wavelength-tunable filter, n is any one of 1, 2, 3, and 4, and the channel 5 has the wavelength characteristic of the channel 1, the channel 6 has the wavelength of the channel 2, and the channel 7 has the characteristic of the channel 3.

That is, a channel set up method of optical receiver with wavelength tunable filter comprising: a step of setting a reference channel temperature range and of checking a wavelength selected in the temperature range from communication signal channels with a predetermined wavelength spacing by scanning the temperature of a wavelength-tunable filter in the set temperature range, a step of inputting the temperature of the wavelength-tunable filter, where a set reference channel is turned and received in a predetermined temperature range, into a memory, a step of setting the temperatures of the wavelength-tunable filter corresponding to a reference channel +1, a reference channel +2, and a reference channel +3 by changing the temperature of the wavelength-tunable filter, and then keeping them in the memory, and a step of storing information, which matches the reference channel, the reference channel +1, the reference channel +2, and the reference channel +3 with an actual communication channel number, in the memory.

Further, the channel set up according to the present invention is a method of selectively receiving channels of all communication wavelengths within a predetermined temperature range using two adjacent transmissive modes in the transmissive modes of an FP type etalon filter. The channels that are selected with the temperature of a wavelength-tunable filter increases have a cyclic characteristic.

Advantageous Effects

Since the temperature for selecting all channels is set within a range of 32° C. in the optical receiver according to the present invention, the temperature of a heater or a thermoelectric element are used only within a predetermined narrow temperature range. Therefore, it is possible to reduce power consumption by the heater or the thermoelectric element and to use all wavelength-tunable filters.

DESCRIPTION OF DRAWINGS

FIG. 1 illustrates an example of a wavelength-tunable filter of that the transmissive wavelength is changed by a heater.

FIG. 2 illustrates an example of a transmissive characteristic curve of an FP type etalon filter.

FIG. 3 illustrates an example of a process of setting a wavelength in DWDM with 4 channels at 100 GHz and selecting an optical signal at one wavelength by a wavelength-tunable filter in a structure following NG-PON2.

FIG. 4 illustrates an example of a process of selecting a wavelength without using a cyclic characteristic of a filter according to the present invention.

FIG. 5 illustrates an example of a process of narrowing a temperature variable range for selecting a channel using a cyclic characteristic of an FP type etalon filter according to the present invention.

FIG. 6 illustrates another example of a process of narrowing a temperature variable range for selecting a channel using a cyclic characteristic of an FT type etalon filter according to the present invention.

DETAILED DESCRIPTION OF THE PREFERRED EMBODIMENT

Hereinafter, preferred embodiments not limiting the present invention will describe in detail with reference to the accompanying drawings.

FIG. 4 illustrates an example of a process of selecting a wavelength without using a cyclic characteristic of a filter according to an embodiment of the present invention.

FIG. 4-a illustrates four communication wavelength channels having a spacing of 100 GHz. FIG. 4-b illustrates transmissive peak bands of an FP type etalon filter manufactured as an example. An embodiment t when the FSR of an FP type etalon filter is 400 GHz is exemplified in the following description of the present invention. Further, an embodiment when channels are set while temperature is increased is exemplified in the description.

In this case, the transmissive peak of the etalon filter which has a smaller wavelength than a channel a may be selected as a transmissive peak for selecting a wavelength. That is, as in FIG. 4-b, m+1-th mode in the transmissive wavelength modes of the FP type etalon filter having a plurality of transmissive wavelength peaks already has a longer wavelength than the channel 1. Therefore, the channel "a" cannot be selected by the method of increasing temperature. Accordingly, it is required to use the m-th transmissive mode in the transmissive modes of the etalon filter in order to tune channels by means of the method of increasing temperature.

It is assumed that the m-th mode transmissive wavelength of the FP type etalon filter at a specific temperature $T_0$ is "aa". Since this wavelength is not the wavelength of the channel "a", so it is assumed that the temperature $T_1$ should be added to adjust the FP type etalon filter to the channel "a". In this case, $T_1$ corresponds to an FSR. That is, when the FSR is 400 GHz and temperature dependency of the transmissive peak of an etalon filter is 12.5 GHz/° C., $T_1$ may be any one between 0 and 32° C. This is because when $T_1$ is larger than 32° C., it becomes the same as 0 (zero) due to the cyclic characteristic of etalon filters. That is, as illustrated in FIG. 4, in order to obtain a wavelength-tunable characteristic using an etalon filter regardless of a transmissive peak wavelength of etalon filters at a specific temperature $T_0$, it is required to change the temperature of a wavelength-tunable filter to $T_0$ to $T_0+T_1+24°$ C., as in FIG. 4-c. Since $T_1$ is in the range of 0 to 32° C., it is required to change temperature of a heater or a thermoelectric element in the range of 24 to 56° C. There is a problem with adjusting temperature by 56° C. using a heater or a thermoelectric element due to large power consumption.

FIG. 5 illustrates a process of narrowing a temperature variable range for selecting a channel using a cyclic characteristic of an FP type etalon filter according to the present invention.

In FIG. 5, it is assumed that four communication wavelength channels have a spacing of 100 GHz and an FP type etalon filter has an FSR of 400 GHz. Further, it is assumed that the transmissive wavelength of the FP type etalon filter exists between a channel "c" and a channel "d" at a specific temperature $T_0$. In this case, it is possible to tune the transmissive wavelength of the FP type etalon filter to a channel "d", as in FIG. 5-b, by changing the temperature of the FP type etalon filter by $T_1$. In this case, $T_1$ may be in the range of 0 to 8° C. When the transmissive peak of the FP type etalon filter selects the channel "d" at a temperature of $T_0+T_1$, other transmissive peaks of the etalon filter exist at the position "aa", which is at 100 GHz apart from the channel "a". Accordingly, using the transmissive peak of the etalon filter at the position "aa" at $T_0+T_1$, it is possible to select the channel "a" at $T_0+T_1+8°$ C., the channel "b" at $T_0+T_1+16°$ C., and the channel "c" at $T_0+T_1+24°$ C. Accordingly, this method makes it possible to select all of the four wavelengths only by adjusting the temperature of the etalon filter within the range of 24 to 32° C., because $T_1$ is in the range of 0 to 8° C.

FIG. 6 illustrates another example of a process of narrowing a temperature variable range for selecting a channel using a cyclic characteristic of an FP type etalon filter according to the present invention.

In FIG. 6, it is assumed that four communication wavelength channels have a spacing of 100 GHz and an FP type etalon filter has an FSR of 400 GHz. Further, it is assumed that the transmissive wavelength of the FP type etalon filter exists between a channel "a" and a channel "b" at a specific temperature $T_0$. In this case, it is possible to tune the transmissive wavelength of the FP type etalon filter to a channel "b", as in FIG. 6-b, by changing the temperature of the FP type etalon filter by $T_1$. In this case, $T_1$ may be in the range of 0 to 8° C. When the transmissive peak of the FP type etalon filter selects the channel "b" at a temperature of $T_0+T_1$, it is possible to select the channel "c" at $T_0+T_1+8°$ C, and the channel "d" at $T_0+T_1+16°$ C. At $T_0+T_1+16°$ C., other transmissive peaks of the etalon filter exist at the position "aaa", which is at 100 GHz apart from the channel "a". Accordingly, using the transmissive peak of the etalon filter at the position "aaa" at $T_0+T_1+16°$ C., it is possible to select the channel "a" at $T_0+T_1+24°$ C. Accordingly, this method makes it possible to select all of the four wavelengths by adjusting the temperature of the etalon filter within the range of 24 to 32° C., because $T_1$ is in the range of 0 to 8° C.

That is, in FIGS. 5 and 6, it is possible to select all of the channels only by adjusting temperature within 24 to 32° C. regardless of where the transmissive wavelength of an etalon filter is in a communication wavelength band. Therefore, this method makes it possible to select all of four wavelength channels only by adjusting temperature maximally by 32° C. using all of etalon filters regardless of the transmissive wavelength at a specific temperature of an FP type etalon filter. It is possible to reduce the energy for the yield ratio of an etalon filter and for adjustment of the temperature of an etalon filter and accordingly thermal stability of a package is improved.

It is preferable to use the following process in order to use this method actually.

First, in a process of manufacturing an optical transceiver in a factory, it is possible to receive a signal through the selected channel by selectively selecting transmissive wavelength of an etalon filter through a step of setting n optical communication reference channels selected within a predetermined temperature range (n may be one of 1 to 4), a step of setting temperatures corresponding channels n+1, n+2, and n+3 while increasing the temperature of a wavelength-tunable FP type etalon filter, a step of storing temperatures corresponding to a channel 1, a channel 2, a channel 3, and a channel 4 in advance in a memory in the optical transceiver, and a step of setting the temperature of an FP type wavelength-tunable filter using the temperature for the channels stored in the memory in order to set a specific channel.

An example of this method is described hereafter. First, in a step of setting a temperature range where a reference channel is set, it is preferable to set a temperature range where a larger wavelength at least than the wavelength spacing of communication wavelengths can be received. For example, in DWDM with a wavelength spacing of 100 GHz, it is preferable to set a temperature range by 8° C. or more when the temperature dependency of the transmissive wavelength of a wavelength-tunable filter is 12.5 GHz/° C.

That is, it can be achieved through a step of setting the range of 40° C. to 48° C. as a reference channel temperature range and of checking a wavelength selected in the temperature range from signal channels with a predetermined 100 GHz wavelength spacing by scanning the temperature of a wavelength-tunable etalon filter within the temperature range, a step of inputting the temperature of the wavelength-tunable filter, where a reference channel is tuned and receive in a predetermined temperature range, into a memory, a step of setting the temperatures of the wavelength-tunable filter corresponding to a reference channel +1, a reference channel +2, and a reference channel +3 by changing the temperature of the wavelength-tunable filter, and then keeping them in the memory, and a step of inputting information, which matches the reference channel, the reference channel +1, the reference channel +2, and the reference channel +3 with an actual communication channel number, in the memory.

That is, when the temperature difference of a wavelength-tunable filter between channels is 8° C., the reference channel is the channel 2. When the temperature where the reference channel is tuned is 41° C., the communication channel 3 is set to 49° C., the communication channel 4 is set to 57° C., and the communication channel 1 is set to 65° C. As another example, when the reference channel is the channel 4 and the temperature where the reference channel is tuned is 47° C., the communication channel 1 is set to 55° C., the communication channel 2 is set to 63° C., and the communication channel 2 is set to 71° C., Even if an etalon filer having a transmissive wavelength at a specific temperature is used in this process, it is possible to set all channel within the range of 32° C. of 40 to 72°°C., so it is possible to reduce power consumption, improve usability of a wavelength-tunable filter, and achieve thermal stability of a package.

The characteristic of the present invention is a method of selectively receiving channels of all communication wavelengths within a predetermined temperature range using two adjacent transmissive modes in the transmissive modes of an FP type etalon filter, so the channels that are selected with the temperature of a wavelength-tunable filter increases have a cyclic characteristic.

The present invention is not limited to the embodiments described above and it should be understood that the present invention may be changed and modified in various ways by those skilled in the art within a range equivalent to the spirit of the present invention and claims to be described below.

The invention claimed is:

1. A method of controlling a temperature of a wavelength tunable filter in order to select desired channels of an optical receiver, and the channels being selected by changing a temperature of the wavelength tunable filter using two adjacent transmissive modes among transmissive modes of an FP type etalon filter have a cyclic characteristic, the method comprising:

(a) selecting a referenced channel temperature range via the FP type etalon filter and scanning the temperature of the wavelength tunable filter, in the selected referenced channel temperature range, to determine a wavelength of a transmissive peak in a current transmissive mode selected in the selected referenced channel temperature range from communication signal channels having a predetermined wavelength spacing;

(b) storing a first temperature (TO+T1) of the wavelength tunable filter into a memory, and, based on a current temperature (TO) of the wavelength of the transmissive peak, increasing the temperature of the wavelength tunable filter to the first temperature (TO+T1) to obtain a first reference channel located within a predetermined temperature range;

(c) increasing the temperature of the wavelength tunable filter via one of a heater and a thermoelectric element, with regard to a communication signal channel having a wavelength existing after the transmissive peak in the current transmissive mode, by a second increase in temperature (+A) which corresponds a second reference channel (+1);

(d) increasing the temperature of the wavelength tunable filter via one of the heater and the thermoelectric element, with regard to the communication signal channel having the wavelength existing after the transmissive peak in the current transmissive mode, by a third increase in temperature (+2A) which corresponds a third reference channel (+2);

(e) increasing the temperature of the wavelength tunable filter via one of the heater and the thermoelectric element, with regard to the communication signal channel having the wavelength existing after the transmissive peak in the current transmissive mode, by a fourth increase in temperature (+3A) which corresponds a third reference channel (+3); and (f) storing, in the memory, information which corresponds to at least the first reference channel, the second reference channel (+1), the third reference channel (+2), and the fourth reference channel (+3).

2. The method according to claim 1, further comprising using one of a heater and a thermoelectric element for controlling the temperature of the wavelength tunable filter.

3. The method according to claim 1, further comprising using a heater for controlling the temperature of the wavelength tunable filter and operating the heater within a temperature range of 90° C. to 130° C. to achieve at least four different wavelengths.

4. The method according to claim 1, further comprising using a thermoelectric element for controlling the temperature of the wavelength tunable filter and operating the thermoelectric element within a temperature range of 40° C. to 80° C. to achieve at least four different wavelengths.

5. The method according to claim 3, further comprising using a temperature range of 32° C., in the optical receiver, for selecting all of the channels.

6. The method according to claim 1, further comprising spacing each one of four communication wavelength channels from one another by a wavelength spacing of 100 GHz.

7. The method according to claim 1, further comprising selecting the third increase in temperature to be greater than the second increase in temperature, the second increase in temperature to be greater than the first increase in temperature, and the first increase in temperature to be greater than the current temperature.

8. The method according to claim 1 further comprising selecting the first increase in temperature to be 8° C. greater than the current temperature, selecting the second increase in temperature to be 16° C. greater than the current temperature (TO), and selecting the third increase in temperature to be 24° C. greater than the current temperature (TO).

\* \* \* \* \*